Figure 1:
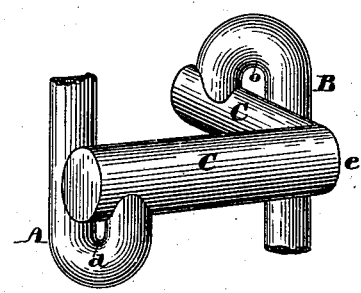

(No Model.)

J. P. PUTNAM.
WATER TRAP.

No. 311,086. Patented Jan. 20, 1885.

Witnesses:
W. W. Swan
Wm S Rogers

Inventor:
J. Pickering Putnam.

United States Patent Office.

J. PICKERING PUTNAM, OF BOSTON, MASSACHUSETTS.

WATER-TRAP.

SPECIFICATION forming part of Letters Patent No. 311,086, dated January 20, 1885.

Application filed September 26, 1884. (No model.)

*To all whom it may concern:*

Be it known that I, JOHN PICKERING PUTNAM, of Boston, Massachusetts, have invented a new and useful Improvement in Water-Traps, of which the following is a specification.

In my application No. 110,630, now pending, I have described, and in substance claimed, a water-trap having between the dip and overflow a chamber long in horizontal direction, but in cross-section narrow and low, the said dip and overflow communicating with the said chamber at the ends thereof, or, in other words, a distance apart practically equal to the distance that water may flow in said chamber on a level. The chamber is described as being small in two dimensions, in order that it may be self-scouring, and as large in the other dimension, in order that, while there always shall remain in the trap a quantity of water larger than the quantity required to fill the lower or inlet bend of the trap, this body of water may be in vertical measurement thin or shallow, with an air-space above it sufficient to allow a column of water or air or of water and air suddenly entering the chamber from the lower bend to pass readily through the thin sheet of water in a vertical direction, and, with scarcely any disturbance to such sheet of water, find an easy passage along the air-space above; and in the said application No. 110,630 it is shown that in operation, after the first action of siphonage, when the water fills the inlet-bend of the trap and lies in a thin and extended sheet in the bottom of the chamber, covering the entrance therein from the lower or inlet bend, and there takes place a rapid flowing of water through the main discharge or soil pipe, with which the trap communicates, the air in the chamber above the thin sheet of water will be sucked out, and to fill the partial vacuum thereby caused the water in the lower bend or dip and air behind will be drawn into the chamber. The water thus entering with great force will easily pass through the thin sheet of water, and then be broken up as it is thrown or deflected from wall to wall in the chamber, while the air following or even entering with it will be drawn into the upper bend or overflow, and, finally, when the siphonage ceases, it will be found that the siphonage has been fed by air alone. The light air is easily sucked out of the chamber, while the heavy water remains upon or falls to the bottom of the chamber. In the same application, No. 110,630, it is set forth that it is not necessary that the large dimension of the chamber or the long horizontal measurement of the thin sheet of water shall be continuous in one direction. Practically there will be the same length of channel to hold the thin water if the chamber is made with turns and bends in any direction, not anywhere disturbing the level of the sheet of water in the chamber. Bends or turns in the chamber interfere little with the passage through the chamber of air which has entered through the thin sheet of water, but do interfere much with the passage of water which has entered through the thin sheet of water and been broken up in effecting such entrance.

The object of the present application, which is regarded as a division of said application 110,630, is to obtain a patent for a modified or special form of trap embodying the said original invention, which shall contain a chamber having such a bend or turn. As before, the water lies along the bottom or channel of the chamber in a shallow sheet, so that other water and air, and more especially air, may pass through it with little disturbance, and, as before, there is sufficient air-space above the water in the channel for the free passage of air without disturbance of the water already in the channel, and, as before, the length of the space through which air may thus travel above the water—and the channel must be of substantially the same length—is sufficiently extended to allow the substantially entire separation of such traveling air from the heavier water; but what is a new feature in the present modification, the horizontal body—it may be a slightly-enlarged section of pipe—containing the chamber of it, is bent horizontally, so that the chamber and also the water channel or bed in the bottom of the chamber and the air-path above the channel are all more or less L-shaped. The angle or angles thus formed—for there may be more than one bend or elbow—do not sensibly retard the passage of air through the chamber by suction, while they effectually retard the passage of water.

Figure 2:
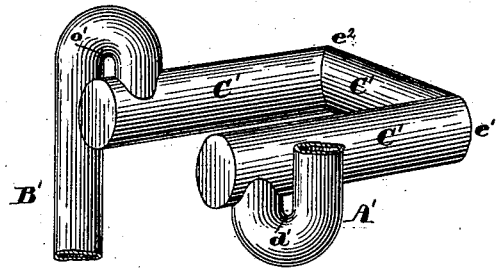

In the drawings, Figure 1 represents a simple form of trap containing the above-described invention where the chamber has a single elbow. Fig. 2 is a form of trap in which the chamber has two elbows.

A, Fig. 1, is the inlet-pipe of the trap, containing the dip $d$. B is the outlet-pipe of the trap, containing the overflow $o$. C is the chamber containing an elbow at $e$. In the further modification at Fig. 2, A' and B' are the inlet and outlet pipes, containing dip and overflow $d'$ and $o'$, and C' is a chamber containing two elbows, $e'$ and $e^2$.

Further description of the mode of operation is unnecessary.

In another division of this application filed herewith I have described, and in substance claimed, a water-trap provided with a chamber between the dip and overflow, which is partially divided by a partition, whereby the chamber is made self-scouring, and the horizontal distance which air or air and water may travel in the chamber between the inlet and outlet thereof is increased. It is evident that such a chamber contains the substance of the elbow feature of the present chamber, and accordingly the form of chamber shown in said other divided application comes broadly under the claim made herein; but no claim is herein made to the special form of trap in which the chamber between the dip and overflow has a chamber divided by a partition, the invention embodying such special form of construction being claimed in said other division. Nor in the present application do I make the broad claim to a water-trap having between the dip and overflow a long narrow and low chamber, the dip and overflow communicating with the said chamber a distance apart practically equal to the distance that water may flow therein on a level, having made the said broad claim in application No. 110,630, of which this is now filed as a division.

I do claim herein—

A water-trap having between the passages containing the dip and overflow a chamber with an elbow or bend, the said chamber being long in horizontal measurement, measuring around the bend or elbow, and low and narrow in vertical cross-section, substantially as described, for the purpose specified.

J. PICKERING PUTNAM.

Witnesses:
  W. W. SWAN,
  WM. S. ROGERS.